(12) United States Patent
Kuroyanagi et al.

(10) Patent No.: US 7,304,473 B2
(45) Date of Patent: Dec. 4, 2007

(54) ROTATIONAL ANGLE DETECTING DEVICE

(75) Inventors: Susumu Kuroyanagi, Anjo (JP);
Yukihiro Kato, Kariya (JP)

(73) Assignee: DENSO CORPORATION, Kariya (JP)

( * ) Notice: Subject to any disclaimer, the term of this patent is extended or adjusted under 35 U.S.C. 154(b) by 50 days.

(21) Appl. No.: 11/208,761

(22) Filed: Aug. 23, 2005

(65) Prior Publication Data
US 2006/0066296 A1 Mar. 30, 2006

(30) Foreign Application Priority Data
Sep. 28, 2004 (JP) ............................ 2004-282498

(51) Int. Cl.
*G01B 7/30* (2006.01)
*G01R 33/07* (2006.01)

(52) U.S. Cl. ............................ 324/207.25; 324/207.2; 324/251

(58) Field of Classification Search ........... 324/207.25, 324/207.2, 251; 73/514.31, 514.39; 338/32 R, 338/32 H
See application file for complete search history.

(56) References Cited

U.S. PATENT DOCUMENTS 4,048,670 A * 9/1977 Eysermans ................. 361/813
2002/0167310 A1* 11/2002 Wallner et al. ........ 324/207.25

FOREIGN PATENT DOCUMENTS

| JP | A-2002-323345 | 8/2002 |
|---|---|---|
| JP | A-2003-149000 | 5/2003 |

* cited by examiner

*Primary Examiner*—Bot LeDynh
(74) *Attorney, Agent, or Firm*—Posz Law Group, PLC

(57) ABSTRACT

A rotational angle detecting device includes a sensor portion disposed on a shaft. The sensor portion includes longitudinal hall elements disposed perpendicular to each other for outputting a hall voltage proportional to a magnetic flux induced by a magnet disposed on the shaft. The device also includes an engagement mechanism for maintaining a positional relationship with the magnet in which a center portion of the sensor is aligned with a center portion of the magnet.

9 Claims, 9 Drawing Sheets

US 7,304,473 B2

ROTATIONAL ANGLE DETECTING DEVICE

CROSS REFERENCE TO RELATED APPLICATION

This application is based upon, claims the benefit of priority of, and incorporates by reference the contents of Japanese Patent Application No. 2004-282498 filed on Sep. 28, 2004.

FIELD OF THE INVENTION

The present invention relates to a rotational angle detecting device for detecting the rotational angle of each of various kinds of rotating members, such as a throttle valve, a steering wheel, etc.

BACKGROUND OF THE INVENTION

Referring to FIG. 17, a conventional lateral Hall sensor (element) 170 is shown in which a magnetic flux 172 appears in a direction perpendicular to the constant current 174. As known by those skilled in the art, the resultant Hall voltage $V_H$ can be obtained for detecting the magnetic flux 172.

A rotational angle detecting device for detecting the rotational angle of each of various kinds of rotating members in non-contact style by using a Hall element is generally known. (For example, see JP-A-2003-149000). FIG. 15 shows one of rotational angle detecting devices which is practically used at present.

As shown in FIG. 15, this rotational angle detecting device is equipped with a mold IC (integrated circuit) 24 containing a Hall element 20 at the upper portion of a housing HG. This mold IC 24 is mounted in a holder HD fixed in the housing HG, and a cylindrical magnet 26 is provided at the lower side of the holder HD on the graph so that the gap between the cylindrical magnet 26 and the holder HD (accurately, the mold IC 24) by a center shaft 25 and rotates around the center shaft 25. The magnetic 26 is connected to one end of a rotating shaft 27 in the housing HG, and rotates in connection with the rotation of the rotating shaft 27. Furthermore, a gearwheel 28 is provided to the other end of the rotating shaft 27 which extends to the outside of the housing HG, and the gearwheel 28 is engaged with a gearwheel 32 mounted on a rotating shaft 31 which is a detection target. Therefore, the rotation of the rotating shaft 31 as a detection target is transmitted through these gearwheels 32 and 28 to the rotating shaft 27, and further transmitted to the magnet 26 connected to the rotating shaft 27. At this time, the rotation of the magnet 26 varies the magnetic field intensity in the neighborhood of the holder HD, and an output voltage of the Hall element 20 provided to the mold IC 24, that is, the Hall voltage is also varied in connection with the variation of the magnetic field intensity. That is, the rotational angle of the rotating shaft 31 as the detection target is detected on the basis of the variation of the Hall voltage. When the rotational angle detecting device is a throttle sensor, the rotating shaft 31 is a rotating (driving) shaft of a throttle valve.

FIGS. 16A and 16B schematically show the arrangement relationship between the Hall element 20 containing the holder HD and the magnet 26 in the rotational angle detecting device described above.

FIG. 16A shows a side view showing the structure of the rotational angle detecting device. In this detecting device, a lateral type Hall element which is generally and frequently used as the Hall element 20 described above is adopted, and the lateral type Hall element 20 is adhesively fixed onto the holder HD through an adhesive agent or the like in the form of a resin molded product as the mold IC 24 so that the resin molded product stands on the holder HD. The holder HD is provided with a projecting portion HDa serving as a guide. When the mold IC 24 is mounted on the holder HD, two molds IC 24 are arranged so as to intersect each other at an angle of 90 degrees with respect to the projecting portions HDa as shown in the planar structure of FIG. 16B. Furthermore, as illustrated in FIG. 16A, the rotating shaft 27 connected to the magnet 26 also serves as the center shaft 25 for the sake of convenience. In the mode shown in FIG. 16A, the gap between the holder HD and the magnet 26 is adjusted so that the magnetic flux (magnetic field) emitted from the magnet 26 is accurately incident to the Hall element 20, whereby the rotational angle of the rotating shaft 27, and thus the rotating shaft 31 in the above style can be detected.

The rotational angle detecting device as described above has a structure such that two lateral Hall elements 20 are used and the rotational angle of the rotating shaft 31 as a detection target is detected. Therefore, these Hall elements 20 are required to be disposed to intersect with the holder HD at 90 degrees accurately. Accordingly, the projecting portions HDa are provided to the holder HD to guide the arrangement of the Hall elements 20 (mold ICs 24). The arrangement of the Hall elements 20 (mold ICs 24) on the holder HD is performed by adhesion using adhesive agent or the like as stated above. Therefore, even when the projecting portions HDa serving as the guides are provided, there is a risk that the Hall elements 20 may be adhesively attached to the holder HD while positionally displaced in the lateral direction along the surface of the projecting portion HDa or the 90-degree arrangement relationship cannot be accurately achieved due to dispersion in thickness of the adhesive agent. When the arrangement position of the Hall elements 20 is displaced or the 90-degree arrangement relationship between the Hall elements and the holder HD is not satisfied, the output characteristics of the Hall elements 20 are deteriorated, and the reliability as the rotational angle detecting device is greatly lost.

Furthermore, as described above, according to the rotational angle detecting device, it is required that the magnetic flux (magnetic field) emitted from the magnet 26 acts in parallel to the surface of the holder HD so as to be accurately incident to the Hall elements 20 and also the rotational center of the magnet 26 and the center of the two Hall elements provided on the holder HD are coincident with each other with high precision. However, in the conventional rotational angle detecting device, the tip of the rotating shaft 27 (the center shaft 25) and the lower surface of the holder HD are brought into point-contact with each other, and thus center displacement is liable to occur, which is one factor that may cause lower reliability of the rotational angle detecting device.

SUMMARY OF THE INVENTION

In view of the foregoing situation, it is an object to provide a rotational angle detecting device that can detect the rotational angle of a rotating shaft as a detection target with high precision by using Hall elements.

In order to attain the above object, according to a first aspect, a rotational angle detecting device for applying to a sensor portion having a Hall element magnetic field emitted from a magnet rotated in connection with rotation of a rotating shaft as a detection target for which the rotational angle is detected, and detecting the rotational angle of the rotating shaft as the detection target on the basis of the value of a Hall voltage output from the Hall element in accordance with the intensity of the magnetic field thus applied, is characterized in that the sensor portion is equipped with at least two longitudinal Hall elements that are disposed in 90-degree arrangement relationship to detect a magnetic field component horizontal to the substrate surface of a semiconductor substrate, and an engaging mechanism for making the center of the rotation of the magnet mechanically coincident with the center of the sensor portion at which lines passing through the center points of the longitudinal Hall elements and perpendicular to the arrangement directions of the longitudinal Hall elements intersect to each other while the magnetic field emitted from the magnet is applied to the substrate surface of the semiconductor substrate in parallel is provided between the sensor portion and the magnet.

According to the above construction of the rotational angle detecting device, by adopting the longitudinal Hall elements as the Hall elements, the Hall elements disposed in the 90-degree arrangement relationship can be accurately formed in the semiconductor substrate, and also there is provided the engaging mechanism for making the center of the rotation of the magnet mechanically coincident with the center of the sensor portion while the magnetic field emitted from the magnet is applied to the substrate surface of the semiconductor substrate in parallel. Therefore, the relationship between the magnet and the longitudinal Hall elements disposed accurately in the 90-degree arrangement relationship can be properly kept at all times. Therefore, the detection precision of the rotational angle detecting device using the Hall elements can be necessarily kept high unlike the conventional device.

Furthermore, according to a second aspect, in the rotational angle detecting device described above, the sensor portion is form by resin-molding the semiconductor substrate having the longitudinal Hall elements formed thereon with mold resin together with a lead frame, and the engaging mechanism is provided with a recess portion, the tip of a shaft which is disposed at the position corresponding to the center of the sensor portion of a surface of the mold resin parallel to the semiconductor substrate and serves as the center of the rotation of the magnet being engaged with the recess portion. Accordingly, the construction of the sensor portion itself can be simplified, and also the engaging mechanism having the above function can be remarkably easily implemented.

According to a third aspect, in the above rotational angle detecting device, the recess portion of the mold resin constituting the engaging mechanism is provided with a bearing formed of metal material processed so as to have such a shape that the tip of the shaft serving as the center of the rotation of the magnet is engaged with the bearing. Accordingly, the wear resistance as the engaging mechanism can be enhanced.

Furthermore, according to a fourth aspect, in the above rotational angle detecting device, the bearing formed of the metal material is formed as a part of the lead frame. Accordingly, the number of parts can be reduced while keeping the wear resistance as the engaging mechanism.

According to a fifth aspect, in the above rotational angle detecting device, the sensor portion is formed by resin-molding the semiconductor substrate having the longitudinal Hall elements formed thereon with mold resin together with a lead frame, and the engaging mechanism is equipped with a circular recess portion or convex portion provided on a surface of the mold resin parallel to the semiconductor substrate with the center of the sensor portion set as a center point thereof, and a circular convex portion or recess portion provided on the surface of the magnet with the center of the rotation of the magnet set as a center point thereof, the center of the rotation of the magnet being made mechanically coincident with the center of the sensor portion through the engagement between the recess portion or the convex portion and the convex portion or the recess portion. In this case, the construction of the sensor portion itself can be also simplified, and particularly with respect to the engaging mechanism, the contact area (engagement area) can be suitably enlarged, so that the state where the magnetic field emitted from the magnet is applied to the substrate surface of the semiconductor substrate in parallel can be more stably kept.

Furthermore, according to a sixth aspect, in the rotational angle detecting device, the convex portion constituting the engaging mechanism are formed so as to be sectioned into plural arcuate portions. Even in the case of the above construction, the static friction can be reduced.

Still furthermore, according to a seventh aspect, the convex portion constituting the engaging mechanism is formed as one or plural hemispheres provided in a circular locus. In this case, the effect of reducing the static friction can be more enhanced. In any construction, containing the fifth aspect, the recess portion or the convex portion can be formed by normal die molding, and it can be easily implemented.

Furthermore, according to an eighth aspect, the rotational angle detecting device further comprises a calculation unit for carrying out differential calculation on the values of Hall voltages output from the longitudinal Hall elements arranged in the 90-degree arrangement relationship, that is, carrying out the calculation of "$\sin\theta - \cos\theta$". Accordingly, the linearity of the output of the rotational angle detecting device can be greatly enhanced, and the detection of the rotational angle of the rotating shaft as a detection target can be easily performed with high precision. A differential amplifier or the like may be used as the calculating unit.

BRIEF DESCRIPTION OF THE DRAWINGS

The above and other objects, features and advantages of the present invention will become more apparent from the following detailed description made with reference to the accompanying drawings. In the drawings:

FIGS. 7A and 7B show a second embodiment of the rotational angle detecting device of the present invention, wherein FIG. 7A is a partially cross-sectional view and a side view showing the side structure, and FIG. 7B is a plan view showing the planar structure of a magnet;

FIGS. 8A and 8B show a modification of the second embodiment, wherein FIG. 8A is a partial cross-sectional view and a side view showing the side structure, and FIG. 8B is a bottom plan view showing the bottom surface structure of mold resin;

FIGS. 9A and 9B show another modification of the second embodiment, wherein FIG. 9A is a partial cross-sectional view and a side view showing the side structure, and FIG. 9B is a bottom plan view showing the planar structure of the magnet;

FIGS. 10A and 10B show another modification of the second embodiment, wherein FIG. 10A is a partial cross-sectional view and a side view showing the side structure, and FIG. 10B is a bottom plan view showing the bottom surface structure of mold resin;

FIGS. 16A and 16B show the angle detecting principle of the conventional rotational angle detecting device, wherein FIG. 16A is a side view showing the side structure, and FIG. 16B is a plan view showing the plan structure;

DETAILED DESCRIPTION OF THE PREFERRED EMBODIMENTS

Preferred embodiments according will be described hereunder with reference to the accompanying drawings.

FIRST EMBODIMENT

FIGS. 1 to 4 show a first embodiment of a rotational angle detecting device. The overall structure of the rotational angle detecting device of this embodiment is based on the structure of the device shown in FIG. 15, however, it is different from the structure of the device shown in FIG. 15 in the structure of the sensor portion and in that an engaging mechanism is newly provided between the sensor portion and the magnet.

Figure 1:
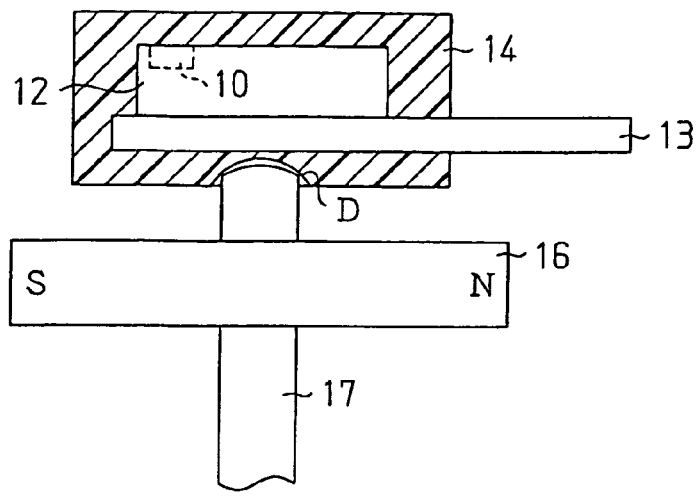
FIG. 1 is a partial cross-sectional view and a side view showing the side structure of a first embodiment of a rotational angle detecting device.
Figure 16A:
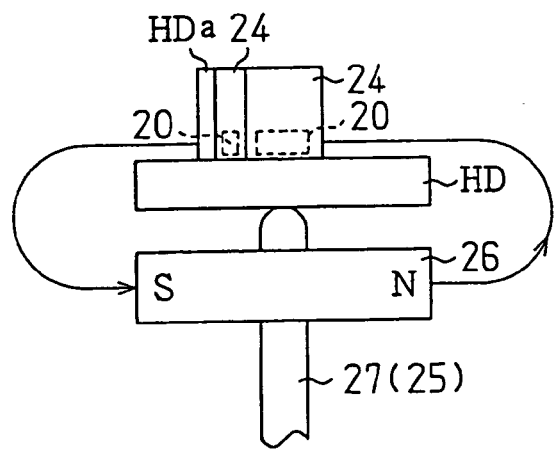
Figure 16B:
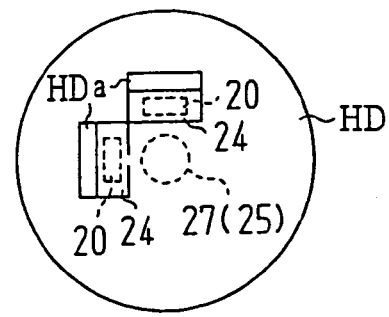
Figure 17:
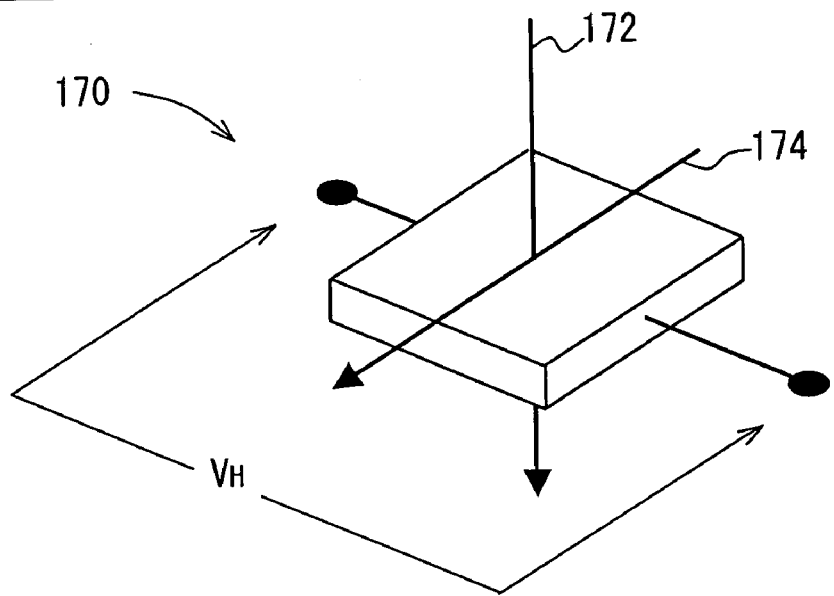
FIG. 17 is an illustration of a conventional lateral Hall element.

FIG. 1 is a schematic diagram showing the sectional structure and side structure of a sensor portion of the rotational angle detecting device according to this embodiment, which corresponds to FIG. 16A. The basic structure of the rotational angle detecting device will be described with reference to FIG. 1.

As shown in FIG. 1, in the rotational angle detecting device, a longitudinal Hall element 10 is adopted as a sensor portion. The longitudinal Hall element 10 is formed on a semiconductor substrate to form an IC (integrated circuit) chip 12, and the IC chip 12 and a lead frame 13 used for electrical connection to the external are subjected to resin molding by mold resin 14.

Figure 18:
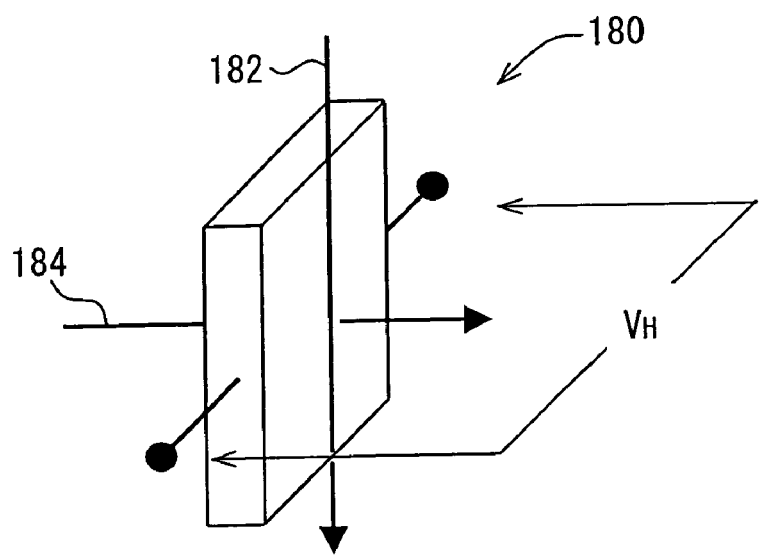
FIG. 18 is an illustration of a longitudinal Hall element.

An exemplary longitudinal Hall element (sensor) 180 is shown more in more detail in FIG. 18. A magnetic flux 184 is detected when a constant current 182 is applied by the Hall voltage $V_H$.

Similarly to the exemplary Hall element 180, the longitudinal type Hall element 10 detects magnetic flux (magnetic field) incident in parallel to the horizontal surface of the IC chip 12 (accurately, the substrate surface of the semiconductor substrate), and outputs the Hall voltage corresponding to the magnetic flux (magnetic field) thus detected. In this embodiment, as described below, two longitudinal Hall elements 10 as described above are disposed in the IC chip 12 so as to intersect to each other at 90 degrees (i.e., the 90-degree arrangement relationship is established). In the case of the longitudinal Hall elements as described above, they can be easily formed in the semiconductor substrate so as to accurately keep the above arrangement relationship as described above by a semiconductor manufacturing process.

Figure 19:
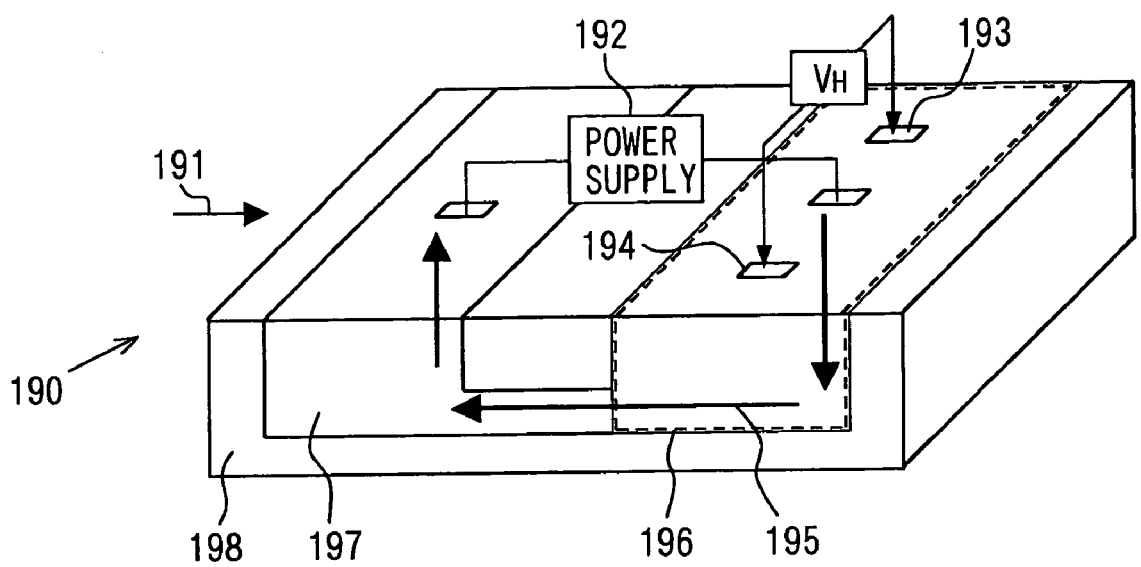
FIG. 19 is an illustration of the structure of a longitudinal Hall element within a chip.

FIG. 19 further shows the structure of an exemplary longitudinal Hall sensor 190. It includes an N well layer 197 disposed within a P type substrate 198. A P well layer is disposed within the N well layer 197. A Hall plate 196 is disposed within the P well. A power supply voltage 192 is applied to the Hall sensor 190. A current flow 195 and a magnetic flux 191 are present. The magnetic flux 191 is detected by the Hall voltage.

Figure 20:
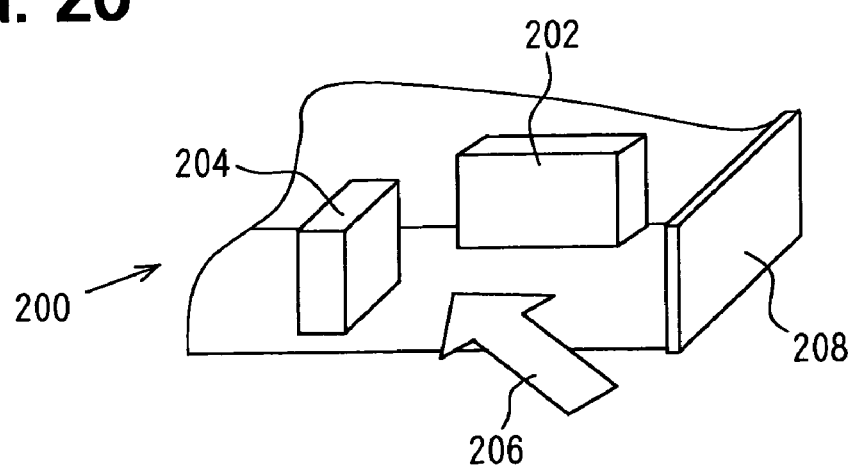
FIG. 20 is an illustration of the arrangement of longitudinal Hall elements within a chip.

FIG. 20 further shows an exemplary arrangement of the longitudinal Hall elements 202, 204 within a silicon chip 208 and an illustration of the direction of the magnetic flux 206 with respect to the longitudinal Hall elements 202, 204.

Returning to FIG. 1, the lead frame 13 is drawn out to the outside so as to supply driving current to the longitudinal Hall element 10 and further take out the Hall voltage of the longitudinal Hall element 10, and actually, it is electrically connected to the IC chip 12 through a bonding wire or the like (not shown).

Still furthermore, in the rotational angle detecting device, a hemispherical recess portion D is formed on the lower surface of the mold resin 14, accurately, at a position where lines which pass through the center points of the longitudinal Hall elements 10 arranged in the 90-degree arrangement relationship and are perpendicular to the arrangement directions of the Hall elements 10 cross each other and which corresponds to the center of the sensor portion. The tip portion of the rotating shaft 17 serving as the center shaft of the magnet 16 is engaged with the recess portion D, and the recess portion D and the tip portion of the rotating shaft (center shaft) 17 constitute an engaging mechanism of this embodiment. The state that the center of the rotation of the magnet 16 and the center of the sensor portion are mechanically coincident with each other is kept through the engagement between the recess portion D and the rotating shaft (center shaft) 17. As described above, the magnet 16 comprises a cylindrical or circular magnet, and it is rotated in connection with the rotation of the rotating shaft (not shown) as a detection target. Furthermore, the tip portion of the rotating shaft (center shaft) 17 is designed in a smooth convex shape (spherical shape), and wear resistance is enhanced between the tip portion of the rotating shaft 17 and the recess portion D formed in the mold resin 14.

Figure 2A:
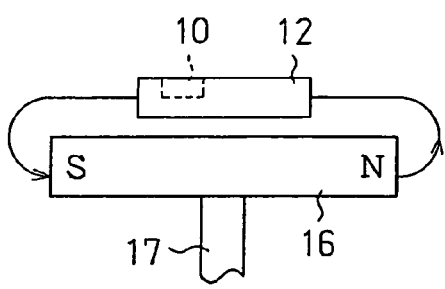
FIGS. 2A and 2B are side view and plan view showing the angle detecting principle of the rotational angle detecting device of the embodiment.
Figure 2B:
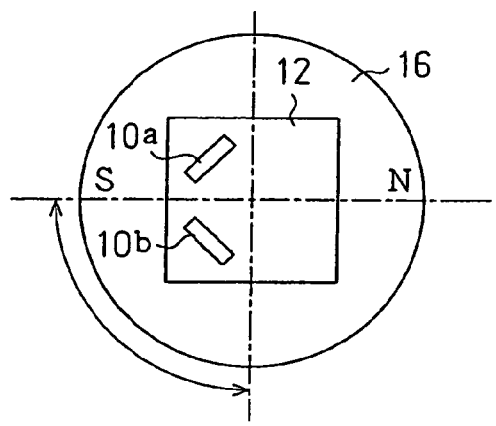

FIGS. 2A and 2B are side view and plan view showing the relationship between the longitudinal Hall elements 10 (IC chip 12) and the magnet 16 of the rotational angle detecting device as described above. Next, the angle detecting principle based on the rotational angle detecting device according to this embodiment will be described with reference to FIGS. 2A-2B.

Figure 15:
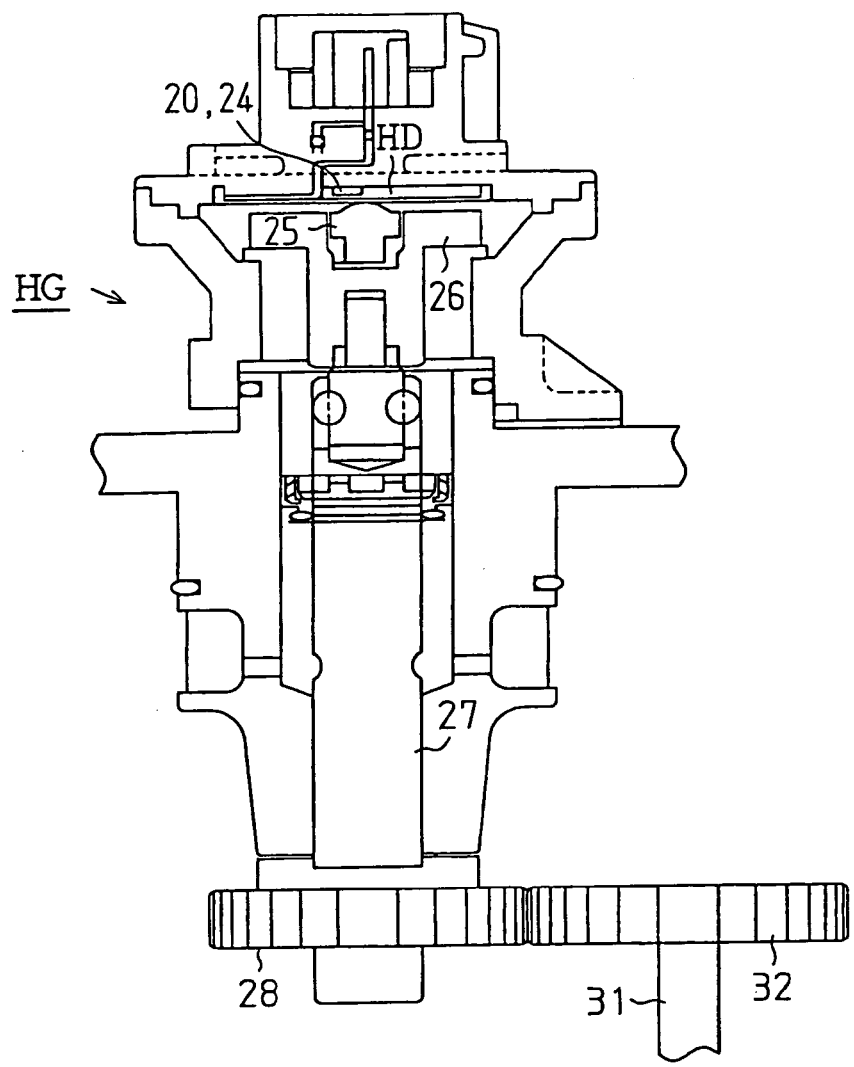
FIG. 15 is a side view showing a conventional rotational angle detecting device.

In the rotational angle detecting device of this embodiment, the arrangement of the magnet 16 with respect to the longitudinal Hall elements 10 (IC chip 12) is determined in the schematic structure of FIG. 2A through the basic structure shown in FIG. 15 and the engaging mechanism described above.

That is, lines of magnetic force emitted from the N-pole side of the magnet 16 are horizontally incident to the horizontal plane of the IC chip 12. When the magnet 16 is rotated under the above state as shown in FIG. 2B, variation of the magnetic field component parallel to the horizontal plane of the IC chip 12 is detected by the two longitudinal Hall elements 10, that is, the first longitudinal Hall element 10a and the second longitudinal Hall element 10b which are arranged in the 90-degree relationship with each other.

That is, when the constant corresponding to the intensity of the magnetic field emitted from the magnet 16 is represented by H and the rotational angle of the magnet 16 is represented by θ, the output S1 the first longitudinal Hall element 10a is represented by the following equation:

$$S1 = H \times \sin\theta \tag{1}$$

Furthermore, the output S2 of the second longitudinal Hall element is delayed in phase from the output S1 of the first longitudinal Hall element 10a by only 90 degrees, and represented by the following equation:

$$S2 = H \times \cos\theta \tag{2}$$

Figure 3:
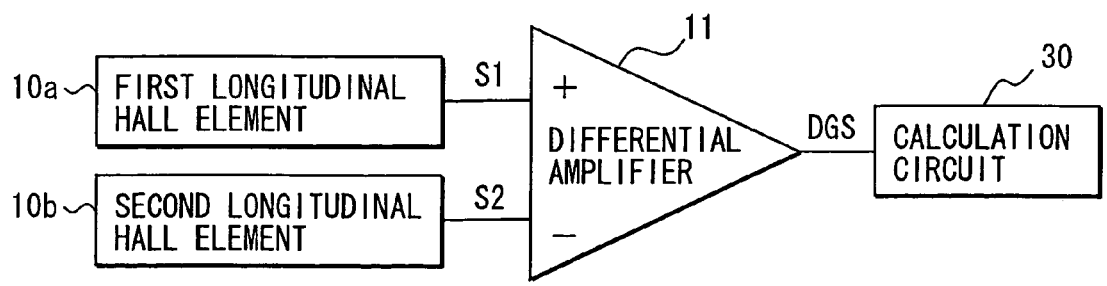
FIG. 3 is a block diagram showing an equivalent circuit to a calculation method of the rotational angle detecting device of the embodiment.

In this embodiment, as shown in FIG. 3, the difference between the output S1 of the first longitudinal Hall element 10a and the output S2 of the second longitudinal Hall element 10b is calculated through a differential amplifier 11, and the calculation result DGS is achieved from the following equation:

$$DGS = H \times \sin\theta - H \times \cos\theta \tag{3}$$

Figure 4:
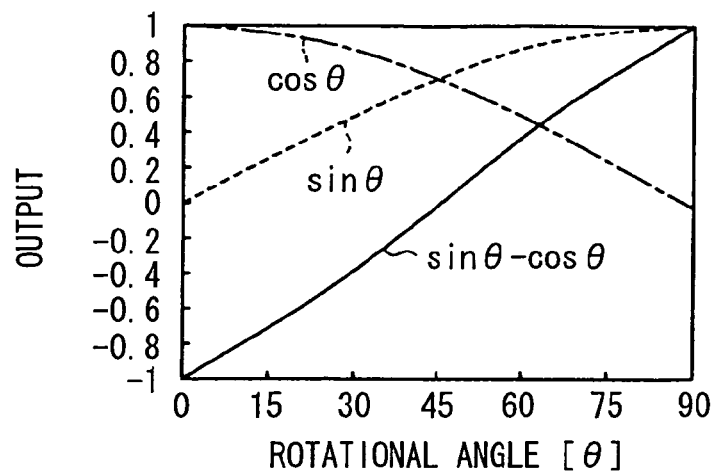
FIG. 4 is a graph showing an output characteristic based on the calculation method.

The calculation result DGS is taken in a calculation circuit, and the rotational angle θ with respect to the calculation result DGS is finally calculated through the calculation circuit 30 as shown in FIG. 4. In FIG. 4, a characteristic curve indicated by "sinθ" corresponds to the output S1 of the first longitudinal Hall element 10a, and a characteristic curve indicated by "cosθ" corresponds to the output S2 of the second longitudinal Hall element 10b. A characteristic curve indicated by "sinθ−cosθ" in FIG. 4 corresponds to the calculation result (differential result) DGS achieved through the differential amplifier 11, and as compared with the two curves, the linearity is greatly improved in the range of "0 degree to 90 degrees". Therefore, if the calculation result DGS indicated as the "output value" in FIG. 4 is achieved, the "rotational angle θ" which uniquely corresponds to the calculation result DGS can be easily achieved with high precision.

The longitudinal Hall element 10 used in this embodiment is an element may be manufactured by a CMOS process, and thus the differential amplifier 11 and calculating means corresponding to the calculation circuit 30 may be installed in combination in the IC chip 12 or separately provided as external devices. At any rate, by adopting the longitudinal Hall element, the degree of freedom in design can be greatly enhanced.

As described above, according to the rotational angle detecting device of this embodiment the following excellent effects can be achieved.

(1) Since the longitudinal Hall element 10 is adopted as the Hall element provided to the sensor portion, the Hall elements arranged in the 90-degree relationship can be accurately formed in the semiconductor substrate.

(2) With respect to the sensor portion, the IC chip 12 having the longitudinal Hall element 10 formed therein is resin-molded by mold resin 14 together with the lead frame 13. Furthermore, the semi-spherical recess portion D is provided at the center as the sensor in the mold resin 14 to thereby construct the engaging mechanism to be engaged with the tip portion of the rotating shaft (center axis) 17 of the magnet 16. Accordingly, the center of the rotation of the magnet can be made coincident with the center as the sensor while the magnetic field emitted from the magnet 16 is applied to the substrate surface of the semiconductor substrate in parallel. Therefore, the relationship between the longitudinal Hall elements 10 arranged accurately in the 90-degree relationship and the magnet 16 can be properly kept at all times. Accordingly, the detection precision as the rotational angle detecting device using the Hall elements can be necessarily kept high.

(3) The tip portion of the rotating shaft (center axis) 17 of the magnet 16 is designed in a smooth convex shape (spherical shape) as the engaging mechanism. Accordingly, the wear resistance between the tip portion of the rotating shaft 17 and the recess portion D provided to the mold resin 14 can be suitably enhanced.

(4) The values of the Hall voltages output from the longitudinal Hall elements 10a, 10b arranged in the 90-degree relationship, that is, the values of the outputs S1 and S2 are subjected to differential calculation in the style of "sinθ−cosθ". Accordingly, the linearity as the output of the rotational angle detecting device is greatly enhanced, and thus the rotational angle of the rotating shaft as a detection target can be more easily detected with high precision.

The above first embodiment may be also implemented in the following styles.

Figure 5:
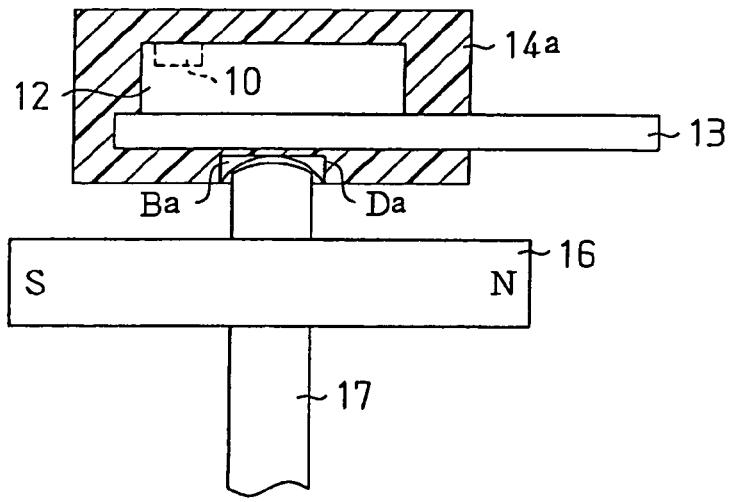
FIG. 5 is a partial cross-sectional view and a side view showing the side structure of a modification of the rotational angle detecting device according to the embodiment.

As shown in FIG. 5 corresponding to FIG. 1, it may be adopted that mold resin 14a having a cylindrical recess portion Da is used as the above resin, and a metal bearing Ba is mounted on the recess portion Da to form the engaging mechanism. Metal materials such as "white metal", "copper-lead alloy", "bronze", "aluminum alloy", etc. may be used for the metal bearing Ba. When the bearing Ba is provided, it is desirable that oil retaining bearing is provided as the bearing Ba or oil and fat material such as grease or the like may be coated between the bearing Ba and the rotating shaft (center axis) 17. Accordingly, the wear resistance as the engaging mechanism can be further enhanced.

Figure 6:
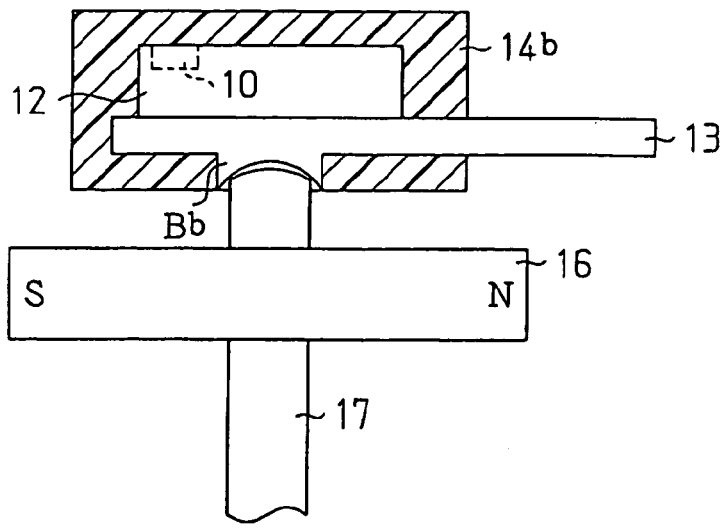
FIG. 6 is a partial cross-sectional view and a side view showing another modification of the rotational angle detecting device of the embodiment.

Furthermore, as shown in FIG. 6 corresponding to FIG. 1, it may be adopted that a lead frame 13 in which a baring Bb is formed in advance as shown in FIG. 6 is used as the lead frame 13, the lead frame 13 as described above is resin-molded together with the IC chip 12 to thereby form mold resin 14b as shown in FIG. 6. In this case, the number of parts can be reduced with keeping the wear resistance as the engaging mechanism.

SECOND EMBODIMENT

A second embodiment of the rotational angle detecting device will be described with reference to FIGS. 7A-7B particularly by focusing on the different point from the rotational angle detecting device of the first embodiment.

Figure 7A:
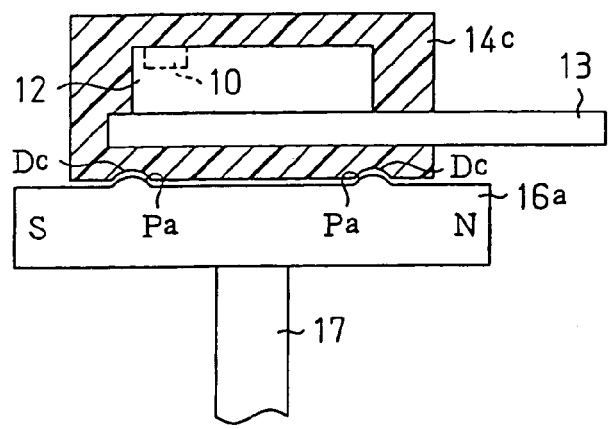
Figure 7B:
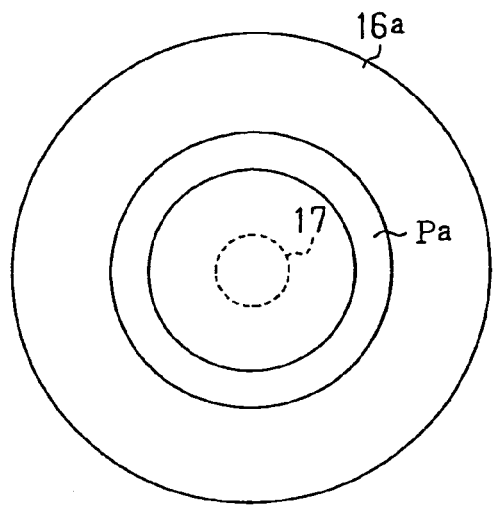

FIG. 7A is a partially cross-sectional and side view showing the overall structure of the rotational angle detecting device according to this embodiment, and FIG. 7B is a plan view showing the structure of a magnet used in this embodiment. In FIG. 7, the same elements as shown in FIG. 1 are represented by the same reference numerals, and the duplicative description thereof is omitted.

The basic angle detecting principle of the rotational angle detecting device of this embodiment is the same as the rotational angle detecting device of the first embodiment shown in FIG. 1, and the operating mode thereof is the same as described above. However, in this embodiment, mold resin 14c having a circular recess portion Dc whose center point is coincident with the center as the sensor portion described above is used as the engaging mechanism as shown in FIG. 7A, and also a magnet 16a having a circular convex portion Pa which is concentric with the recess portion Dc and has the same diameter as the recess portion Dc as shown in FIG. 7B. By engaging the recess portion Dc of the mold resin 14c with the convex portion Pa of the magnet 16a, the center of the rotation of the magnet 16a is kept to be mechanically coincident with the center as the sensor portion.

In the rotational angle detecting device according to the second embodiment, the same effects (1), (2) and (4) as the first embodiment or the effects conformed with them can be achieved, and also the following new effect can be achieved.

(5) The engaging mechanism is designed so that the center of the rotation of the magnet 16a is mechanically coincident with the center as the sensor portion through the engagement between the circular recess portion Dc and the circular convex portion Pa, whereby the contact area (engagement area) as the engaging mechanism can be suitably enlarged. Therefore, the state that the magnetic field emitted from the magnet 16a is applied to the substrate plane of the semiconductor substrate (IC chip 12) in parallel can be more stably kept.

The second embodiment can be also carried out by the following style.

Figure 8A:
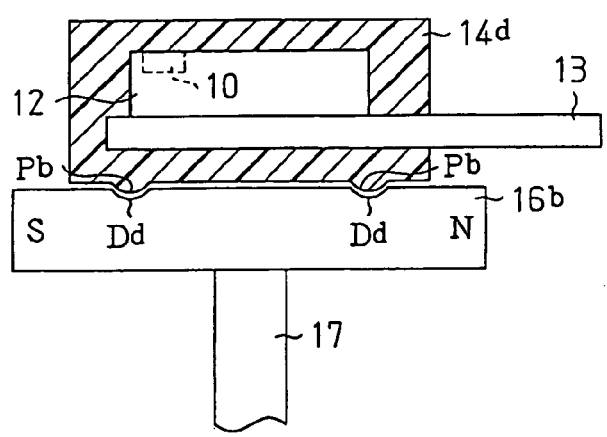
Figure 8B:
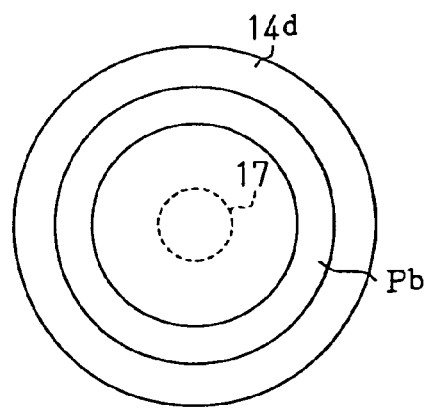

As shown in FIGS. 8A and 8B which correspond to FIGS. 7A and 7B, the relationship between the recess portion and the convex portion may be inverted. That is, as shown in FIGS. 8A and 8B, the engaging mechanism may be designed so that mold resin having a circular convex portion Pb whose center point is set to the center as the sensor portion is used and also a magnet 16b having a circular recess portion Dd which is concentric with the convex portion Pb and has the same diameter as the convex portion Pb is used. FIG. 8B shows the bottom surface construction of the mold resin 14d. The same effect as the second embodiment can be also achieved by the above structure of the engaging mechanism.

Figure 9A:
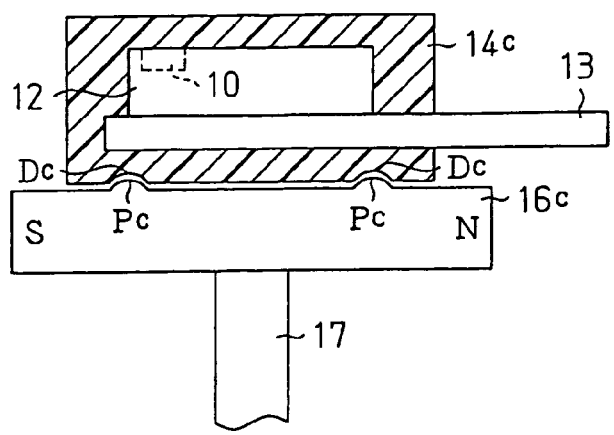
Figure 9B:
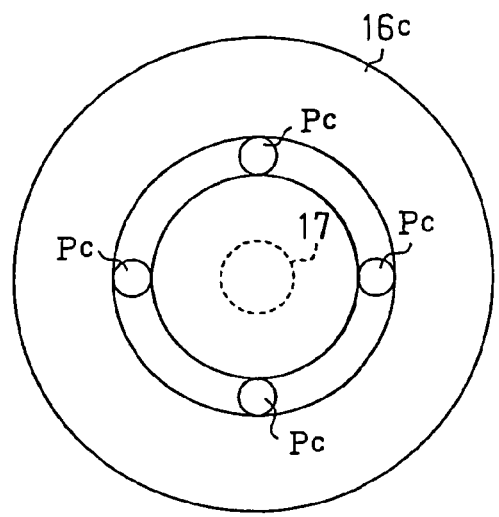
Figure 10A:
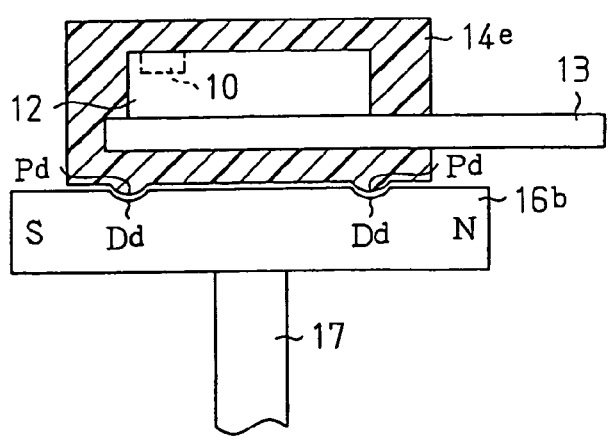
Figure 10B:
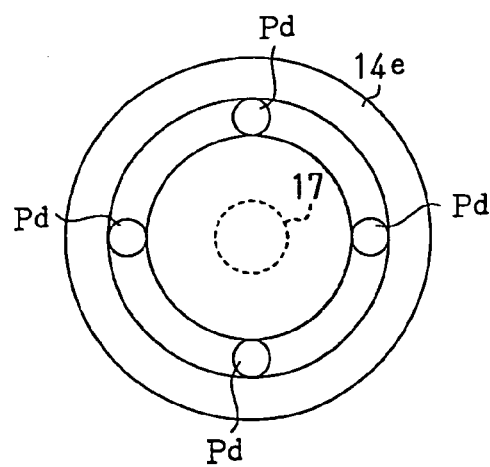

As shown in FIGS. 9A and 9B or FIGS. 10A and 10B which correspond to FIGS. 7A and 7B, the convex portion Pd may be substituted by plural sectioned arcs or by one or plural hemispheres provided in a circular locus. For example, FIGS. 9A and 9B show a case where a magnet 16c using four hemispherical convex portions Pc in place of the convex portion Pa of FIG. 7 is used. FIGS. 10A and 10B show a case where mold resin 14e using four hemispherical convex portions Pd in place of the convex portion Pb shown in FIG. 8 is used. In both the cases, by using the above structures as the engaging mechanism, the static friction can be suitably reduced. Including the examples of FIGS. 7 and 8, the recess portion and the convex portion can be processed by a die forming method, and thus they can be easily implemented.

OTHER EMBODIMENTS

The following is modifiable elements common to the above embodiments.

Figure 11:
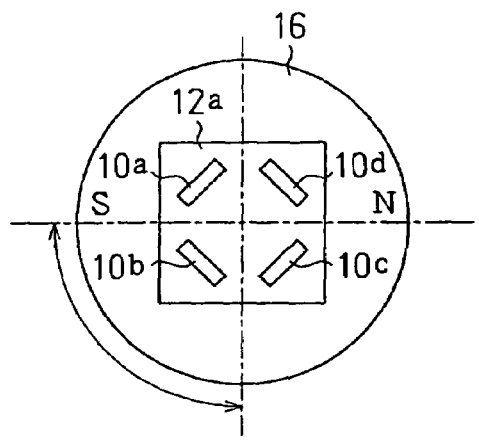
FIG. 11 is a plan view showing another arrangement mode of longitudinal Hall elements as a modification of each of the above embodiments.

In the above embodiments, the rotational angle of the magnet 16 (the rotating shaft as a detection target) is detected by using the two longitudinal Hall elements 10 arranged in the 90-degree relationship. However, the longitudinal Hall element 10 may be constructed as follows. That is, as shown in FIG. 11 corresponding to FIG. 2B, four longitudinal Hall elements 10a to 10d arranged in the 90-degree relationship may be provided in the IC chip 12a. In this case, as described above, when the constant corresponding to the intensity of the magnetic field of the magnet 16 is represented by H and the rotational angle of the magnet 16 is represented by θ, the output S1 of the first longitudinal Hall element 10a and the output S2 of the second longitudinal Hall element 10b are represented by the equations (1) and (2) described above. Likewise, the output S3 of the third longitudinal Hall element 10c is delayed in phase from the output S1 of the first longitudinal Hall element 10a by 180 degrees, and thus it is represented as follows:

$$S3 = H \times (-\sin\theta) \quad (4)$$

Furthermore, likewise, the output S4 of the fourth longitudinal Hall element 10d is delayed in phase from the output S1 of the fourth longitudinal Hall element 10d by only 270 degrees:

$$S4 = H \times (-\cos\theta) \quad (5)$$

Figure 12:
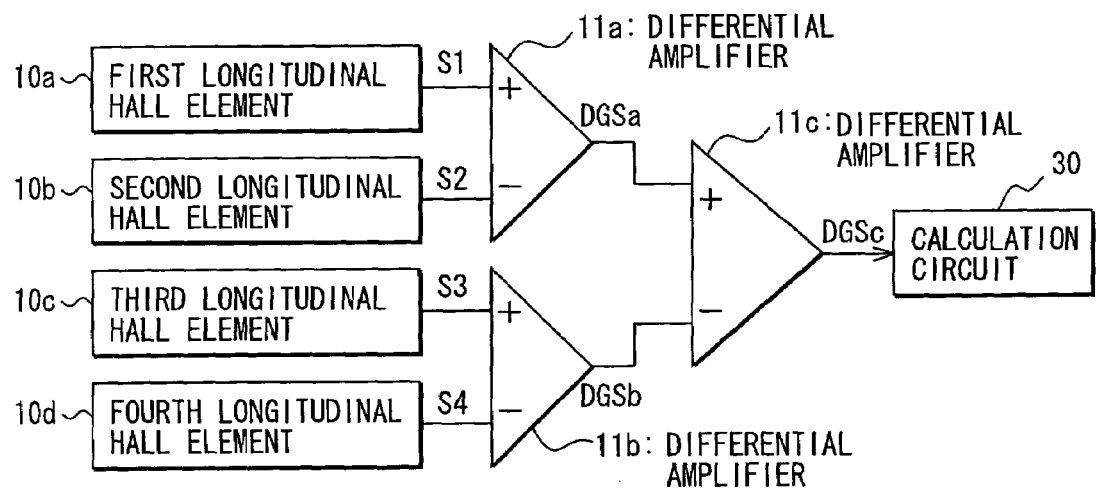
FIG. 12 is a block diagram showing an equivalent circuit to a calculation method which is suitably used to the Hall element structure shown in FIG. 11.

Therefore, as shown in FIG. 12 corresponding to FIG. 3, if differential amplifiers 11a to 11c for operating the outputs S1 to S4 of the four longitudinal Hall elements 10a to 10d is provided and also a calculating circuit 30 for processing the calculation results DGSa to DGSc is provided, the rotational angle could be also detected with high precision. That is, as described above, the output S1 of the first longitudinal Hall element 10a and the output S2 of the second longitudinal Hall element 10b are subjected to differential calculation through the differential amplifier 11a, and the calculation result DGSa is represented as follows:

$$DGSa = H \times \sin\theta - H \times \cos\theta \quad (6)$$

This calculation result is input to the differential amplifier 11c. Likewise, the output S3 of the third longitudinal Hall element 10c and the output S4 of the fourth longitudinal Hall element 10d are subjected to differential calculation through the differential amplifier 11b, and the calculation result DGSb is represented as follows:

$$DGSb = H \times (-\sin\theta) - H \times (-\cos\theta) \quad (7)$$

This calculation result is also input to the differential amplifier 11c. The calculation results DGSa and DGSb are further subjected to differential calculation through the differential amplifier 11c, and the calculation result DGSc is represented as follows:

$$DGSc = 2 \times (H \times \sin\theta - H \times \cos\theta) \quad (8)$$

Accordingly, the amplitude of DGSc is twice as large as that of the equation (3). Accordingly, such a value is subjected to the angle calculation described above in the calculation circuit 30, and thus a high-precision value can be achieved as the "rotational angle θ" described above.

Figure 13:
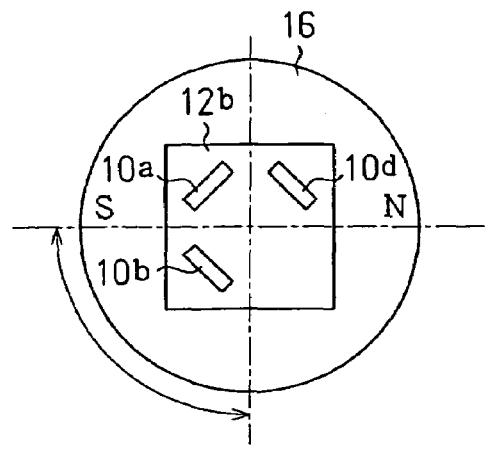
FIG. 13 is a plan view showing another arrangement mode of the longitudinal Hall elements as a modification of each of the above embodiments.
Figure 14:
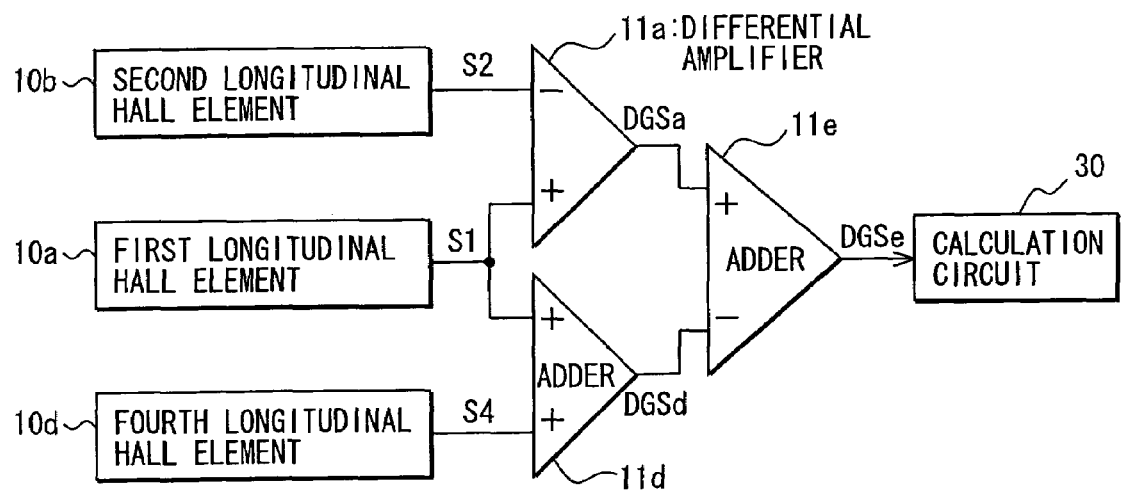
FIG. 14 is a block diagram showing an equivalent circuit to a calculation method which is suitably used for the Hall element structure of FIG. 13.

With respect to the longitudinal Hall element 10, as shown in FIG. 13 corresponding to FIG. 2B, three Hall elements 10a, 10b and 10d arranged in the 90-degree relationship may be provided in the IC chip 12b. In this case, as described above, when the constant corresponding to the intensity of the magnetic field of the magnet 16 is represented by H and the rotational angle of the magnet 16 is represented by θ, the output S1 of the first longitudinal Hall element 10a, the output S2 of the second longitudinal Hall element 10b and the output S4 of the fourth longitudinal Hall element 10d are represented by the equations (1), (2) and (5). Therefore, as shown in FIG. 14 corresponding to FIG. 3, a differential amplifier 11a for carrying out the differential calculation between the output S1 of the first longitudinal Hall element 10a and the output S2 of the second longitudinal Hall element 10b is provided, and an adder 11d for adding the output S1 of the first longitudinal Hall element 10a and the output S4 of the fourth longitudinal Hall element 10d is provided. Still furthermore, an adder 11e for adding the output DGSa of the differential amplifier 11a and the output DGSd of the adder 11d is provided, and the "rotational angle θ" is calculated on the basis of the output DGSe of the adder 11e through the calculation circuit 30. That is, the output S1 of the first longitudinal Hall element 10a and the output S2 of the second longitudinal Hall element 10b are subjected to differential calculation through the differential amplifier 11a, and thus the calculation result DGSa is represented by the equation (6), and the value thereof is taken into the adder 11e. Likewise, the output S1 of the first longitudinal Hall element 10a and the output S4 of the fourth longitudinal Hall element 10d are added to each other through the adder 11d, and thus the calculation result DGSd is represented as follows:

$$DGSd = H \times \sin\theta + H \times (-\cos\theta) \quad (9)$$

This value is also taken into the adder 11e. The output DGSa of the differential amplifier 11a and the output DGSd of the adder 11d are added to each other through the adder 11e, and the calculation result DGSe is represented as follows:

$$DGSe = 2 \times (H \times \sin\theta - H \times \cos\theta) \quad (10)$$

In this case, the amplitude of DGSe is twice as large as that of the equation (3). Accordingly, in this case, such a value is supplied to the angle calculation described above in the calculation circuit 30, and thus a high-precision value can be achieved as the "rotational angle θ".

The magnet 16 (containing 16a to 16c) is not necessarily designed in a circular or cylindrical shape. That is, any design in shape, etc. may be made to the magnet insofar as magnetic field horizontal to the substrate on which the longitudinal Hall element 10 is provided can be applied.

In the above embodiments, the rotational angle of the rotating shaft as a detection target is detected in the range of "0-degree to 90-degrees". However, for example, if a mechanism for changing the gear ratio between the gearwheel 28 and the gearwheel 32 is provided in the device shown in FIG. 15, the detection range of the rotational angle detecting device could be enlarged or reduced. For example, when the gear ratio between the gearwheel 28 and the gearwheel 32 is set to "1:4", the detection range of "0-degree to 90-degrees" can be enlarged to "0-degree to 360-degrees".

What is claimed is:

1. A rotational angle detecting device comprising:
   a sensor portion having a Hall element for detecting the rotational angle of the rotating shaft based upon the value of a Hall voltage output from the Hall element in accordance with the intensity of a magnetic field emitted from a magnet rotated in connection with rotation of the rotating shaft, wherein the sensor portion comprises:
   longitudinal Hall elements disposed in 90-degree arrangement relationship to detect a magnetic field component horizontal to a substrate surface of a semiconductor substrate; and
   an engaging mechanism for making the center of the rotation of the magnet mechanically coincident with a center of the sensor portion at which lines passing through the center points of the longitudinal Hall elements and perpendicular to the arrangement directions of the longitudinal Hall elements intersect to each other while the magnetic field emitted from the magnet is applied to the substrate surface of the semiconductor substrate in parallel is provided between the sensor portion and the magnet.

2. The rotational angle detecting device according to claim 1, wherein the sensor portion is form by resin-molding the semiconductor substrate having the longitudinal Hall elements formed thereon with mold resin together with a lead frame, and the engaging mechanism is provided with a recess portion, the tip of a shaft which is disposed at the position corresponding to the center of the sensor portion of a surface of the mold resin parallel to the semiconductor substrate and serves as the center of the rotation of the magnet being engaged with the recess portion.

3. The rotational angle detecting device according to claim 2, wherein the recess portion of the mold resin constituting the engaging mechanism is provided with a bearing formed of metal material processed so as to have such a shape that the tip of the shaft serving as the center of the rotation of the magnet is engaged with the bearing.

4. The rotational angle detecting device according to claim 3, wherein the bearing formed of the metal material is formed as a part of the lead frame.

5. The rotational angle detecting device according to claim 1, wherein the sensor portion is formed by resin-molding the semiconductor substrate having the longitudinal Hall elements formed thereon with mold resin together with a lead frame, and the engaging mechanism is equipped with a circular recess portion or convex portion provided on a surface of the mold resin parallel to the semiconductor substrate with the center of the sensor portion set as a center point thereof, and a circular convex portion or recess portion provided on the surface of the magnet with the center of the rotation of the magnet set as a center point thereof, the center of the rotation of the magnet being made mechanically coincident with the center of the sensor portion through the engagement between the recess portion or the convex portion and the convex portion or the recess portion.

6. The rotational angle detecting device according to claim 5, wherein the convex portion constituting the engaging mechanism are formed so as to be sectioned into plural arcuate portions.

7. The rotational angle detecting device according to claim 5, wherein the convex portion constituting the engaging mechanism is formed as one or plural hemispheres provided in a circular locus.

8. The rotational angle detecting device according to claim 1, further comprising a calculation unit for carrying out differential calculation on the values of Hall voltages output from the longitudinal Hall elements arranged in the 90-degree arrangement relationship.

9. A rotational angle detecting device comprising:
   a sensor portion disposed on a shaft, wherein the sensor portion includes longitudinal Hall elements disposed perpendicular to each other for outputting a Hall voltage proportional to a magnetic flux induced by a magnet disposed on the shaft; and an engagement mechanism for maintaining a positional relationship with the magnet in which a center portion of the sensor portion is aligned with a center portion of the magnet, wherein the sensor portion is comprises an IC chip having the longitudinal Hall elements formed therein, wherein the IC chip is resin-molded by a mold resin, wherein the engagement mechanism comprises a semi-spherical recess portion provided at a center of the resin mold.

* * * * *